United States Patent
Williams et al.

(10) Patent No.: US 11,614,334 B2
(45) Date of Patent: Mar. 28, 2023

(54) COMPUTERIZED APPLICATIONS FOR COORDINATING DELIVERY DATA WITH MOBILE COMPUTING DEVICES

(71) Applicant: PUT CORP., Chapin, SC (US)

(72) Inventors: Bruce Williams, Boston, MA (US); Caroline Kost Kamp, Phoenix, AZ (US)

(73) Assignee: PUT CORP., Chapin, SC (US)

( * ) Notice: Subject to any disclaimer, the term of this patent is extended or adjusted under 35 U.S.C. 154(b) by 242 days.

(21) Appl. No.: 16/120,077

(22) Filed: Aug. 31, 2018

(65) Prior Publication Data

US 2019/0072397 A1    Mar. 7, 2019

Related U.S. Application Data

(60) Provisional application No. 62/645,663, filed on Mar. 20, 2018, provisional application No. 62/553,718, filed on Sep. 1, 2017.

(51) Int. Cl.
*G06Q 10/08* (2012.01)
*G01C 21/34* (2006.01)
(Continued)

(52) U.S. Cl.
CPC ....... *G01C 21/343* (2013.01); *G01C 21/3676* (2013.01); *G06Q 10/08355* (2013.01); *H04L 67/12* (2013.01); *H04L 67/52* (2022.05)

(58) Field of Classification Search
CPC .... G06Q 10/087; G06Q 10/30; G06Q 10/083; G06Q 10/08; G06Q 10/0833;
(Continued)

(56) References Cited

U.S. PATENT DOCUMENTS

| 6,510,376 B2 | 1/2003 | Burnstein et al. ............ 701/117 |
| 8,738,423 B2 | 5/2014 | Lyle ............................ 705/7.34 |

(Continued)

FOREIGN PATENT DOCUMENTS

| KR | 10-2014-0036505 | 3/2014 | ............ G06Q 50/26 |
| WO | WO2016/130222 | 8/2016 | ............ G06Q 10/08 |

OTHER PUBLICATIONS

Winter, J. (Sep. 3, 2016). Trash takes center stage at town hall. Telegraph—Herald Retrieved from https://dialog.proquest.com/professional/docview/1817012503?accountid=131444 (Year: 2016).*

(Continued)

*Primary Examiner* — Michael P Harrington
(74) *Attorney, Agent, or Firm* — Hayes Soloway P.C.

(57) ABSTRACT

Systems and methods of managing the collection and delivery of goods using mobile computing devices included a management system hosted on a server receiving a request from a first user through an application on a computing device for a pick-up of an item from a first location. A second user capable of fulfilling the pick-up request is identified. Details of the pick-up request are transmitted to an application on a second user computing device, wherein a visual map of the first location is displayed on the user computing device. At least one time-stamped, geo-located photograph of the item is uploaded to the application of the second user computing device. Delivery of the item to a second location is validated through at least one code identifier, wherein the code identifier is transmitted from the management system to the first user computing device.

14 Claims, 9 Drawing Sheets

(51) Int. Cl.
*G01C 21/36* (2006.01)
*G06Q 10/0835* (2023.01)
*H04L 67/12* (2022.01)
*H04L 67/52* (2022.01)

(58) Field of Classification Search
CPC ........ G06Q 10/06311; G06Q 10/0834; G06Q 10/0875; G06Q 30/0601; G06Q 10/02; G06Q 30/00
See application file for complete search history.

(56) References Cited

U.S. PATENT DOCUMENTS

| | | | |
|---|---|---|---|
| 9,047,652 B2 | 6/2015 | Hunscher et al. | G06Q 99/00 |
| 9,202,191 B2 | 12/2015 | Bowen et al. | G06Q 10/08 |
| 9,396,453 B2 | 7/2016 | Hynes et al. | G06Q 10/087 |
| 9,525,967 B2 | 12/2016 | Mamlyuk | H04W 4/02 |
| 9,959,512 B2 | 5/2018 | Camp et al. | G06Q 10/06311 |
| 10,558,939 B2 | 2/2020 | Shroff et al. | G06Q 10/08 |
| 10,685,297 B2 | 6/2020 | Meyer et al. | G06Q 10/02 |
| 10,860,975 B2 | 12/2020 | Paul et al. | G06Q 10/08 |
| 2002/0077875 A1 | 6/2002 | Nadir | 705/8 |
| 2003/0097310 A1 | 5/2003 | Ono et al. | 705/26 |
| 2003/0125963 A1 | 7/2003 | Haken | 705/1 |
| 2005/0038572 A1 | 2/2005 | Krupowicz | 700/305 |
| 2005/0065719 A1 | 3/2005 | Khan et al. | 701/204 |
| 2007/0219862 A1 | 9/2007 | Casella et al. | 705/14 |
| 2007/0268759 A1 | 11/2007 | Sabino et al. | 365/192 |
| 2010/0119341 A1 | 5/2010 | Flood et al. | 414/406 |
| 2010/0208662 A1 | 8/2010 | Fuste Vilella et al. | H04W 40/00 |
| 2010/0306080 A1* | 12/2010 | Trandal | G06Q 10/10 705/26.8 |
| 2011/0182500 A1* | 7/2011 | Esposito | G06F 3/04886 382/159 |
| 2011/0186624 A1 | 8/2011 | Wagner et al. | 235/375 |
| 2011/0279245 A1 | 11/2011 | Hynes et al. | 340/10.42 |
| 2012/0303488 A1 | 11/2012 | Barron et al. | 705/27.1 |
| 2013/0146656 A1* | 6/2013 | Wilke | G06Q 50/28 235/375 |
| 2014/0156327 A1* | 6/2014 | Cai | G06Q 10/063112 705/7.14 |
| 2014/0214697 A1* | 7/2014 | McSweeney | B65F 1/1484 705/308 |
| 2014/0340197 A1 | 11/2014 | Flood | 340/5.81 |
| 2014/0351163 A1 | 11/2014 | Tussy | G06Q 10/08 |
| 2015/0100514 A1* | 4/2015 | Parris | G06Q 10/083 705/340 |
| 2016/0019496 A1* | 1/2016 | Gorlin | C01G 3/04 705/333 |
| 2016/0063435 A1 | 3/2016 | Shah et al. | G06Q 10/08 |
| 2016/0104112 A1 | 4/2016 | Gorlin | G06Q 10/08355 |
| 2016/0104113 A1 | 4/2016 | Gorlin | G06Q 10/08355 |
| 2016/0259341 A1 | 9/2016 | High et al. | G05D 1/0297 |
| 2016/0350567 A1 | 12/2016 | McQuade et al. | G06K 7/10861 |
| 2017/0109704 A1* | 4/2017 | Lettieri | G06Q 10/1093 |
| 2017/0118609 A1 | 4/2017 | Rodoni | H04W 4/20 |
| 2017/0221017 A1 | 8/2017 | Gonen | G06Q 10/30 |
| 2017/0278064 A1 | 9/2017 | Kao et al. | G06Q 10/08355 |
| 2018/0137453 A1* | 5/2018 | Gillen | G06Q 10/00 |
| 2019/0072397 A1 | 3/2019 | Williams et al. | G01C 21/34 |

OTHER PUBLICATIONS

International Search Report and Written Opinion issued in application No. PCT/US18/49253, dated Dec. 4, 2018 (8 pgs).
International Preliminary Report on Patentability issued in application No. PCT/US18/49253, dated Mar. 3, 2020 (6 pgs).
Bilton, "Deliv's same-day delivery service may finally give retailers a fighting change against Amazon", Apr. 12, 2013, 3 pgs.
Chen et al., "Multi-hop driver-parcel matching problem with time windows", Flexible Services and Manufacturing Journal, vol. 30, No. 3, Jan. 12, 2017, 37 pgs.
"Delivering tomorrow. Bring Buddy", Logistik Nachaltige, Oct. 2010, pp. iii, iv, 101, 3 pgs.
"First time in Germany: Car becomes mobile delivery address for parcels", DHL Press Release, Apr. 22, 2015, 1 pg.
Office Action issued in Panama application No. 93005-01 (w/translation), dated Jun. 2, 2021, 7 pgs.
Search Report issued in EP application No. 18 849 524.6, dated Jun. 29, 2021, 15 pgs.
International Search Report and Written Opinion issued in application No. PCT/US21/39220, dated Dec. Sep. 29, 2021 (9 pgs).
Office Action issued in Argentina Application No. P180102480, with machine translation, dated Dec. 1, 2021, 20 pgs.
U.S. Appl. No. 17/359,235, filed Jun. 25, 2021, Williams et al.
Office Action issued in India Patent Application No. 202027013738, dated Mar. 7, 2022, 7 pgs.
International Search Report and Written Opinion issued in PCT/US22/34979, dated Nov. 3, 2022, 9 pgs.
International Preliminary Report on Patentability issued in PCT/US21/39220, dated Dec. 13, 2022 6 pgs.

* cited by examiner

COMPUTERIZED APPLICATIONS FOR COORDINATING DELIVERY DATA WITH MOBILE COMPUTING DEVICES

CROSS REFERENCE TO RELATED APPLICATION

This application claims priority to U.S. Provisional Application Ser. No. 62/553,718 entitled, "System and Related Methods for Refuse Collection Management" filed Sep. 1, 2017 and U.S. Provisional Application Ser. No. 62/645,663 entitled, "System and Related Methods for Refuse Collection Management" filed Mar. 20, 2018, the entire disclosure of which is incorporated herein by reference.

FIELD OF THE DISCLOSURE

The present disclosure is generally related to computerized applications for coordinating delivery data with mobile computing devices.

BACKGROUND OF THE DISCLOSURE

The need for the collection and/or delivery of goods, materials, and refuse is ever increasing in today's consumer-driven society. In particular, the need for the disposal of unwanted items, such as trash and garbage (generally referred to herein as 'refuse') is continually increasing with the growing construction of new buildings and the renovation of existing structures. Customarily, construction debris, demolition debris, and unwanted building materials are disposed of using large dumpsters. These dumpsters are placed at the construction site and over the course of the construction project, workers put these refuse materials in the dumpster. When the dumpster is full, a waste collection company picks up the dumpster and disposes of the contents. Variations on this system include the use of smaller dumpsters or fabric-based refuse collection containers which can be purchased at a store, filled with refuse at a construction site, and removed by a disposal company. While these dumpsters are useful in many large-scale construction projects, smaller projects are often too small to make the use of a large dumpster economically justifiable, since getting a dumpster often costs in excess of $300. Similarly, homeowners handling do-it-yourself (DIY) projects cannot justify the costs of a dumpster relative to the scale of smaller projects.

To avoid the expense, demolition and construction refuse at smaller construction sites is often bagged in plastic trash bags which are then driven to a landfill by the homeowner or by a site worker, such as an employee of a construction company or builder. However, the time it takes for the site workers to dispose of the bagged refuse can be inefficient and negatively affect the bottom line of the project. Furthermore, for construction projects that a homeowner handles themselves, the homeowner may not be knowledgeable about how or where to dispose of certain refuse, nor may they have a suitable vehicle for transporting the refuse to a disposal site. DIYers may be forced to rent a vehicle to dispose of refuse, the costs of which, while typically less than renting a dumpster, can still be high. Moreover, in any situation where refuse needs to be disposed of, the disposing party often needs to wait until someone can pick up the refuse which means the refuse may need to sit curbside until it is picked up. This can cause unsightly appearances to the neighborhood and can create hazardous situations where potentially dangerous refuse is left accessible to children or animals in the neighborhood.

A similar situation occurs with some homeowners and DIYers who have difficulty getting building materials and supplies from stores to their home. Unless the homeowner owns a vehicle capable of carrying larger or heavy building materials, such as lumber, the homeowner must rely on someone with a vehicle capable of carrying the materials. In some cases, the homeowner may be able to rent a vehicle to carry the goods, but the costs of the rental can easily exceed $50 for just 1 hour of use of the vehicle. For a homeowner wanting to tackle a project at his or her home, one of the biggest hurdles he or she may face is the logistics of simply getting the building materials to their home.

Thus, a heretofore unaddressed need exists in the industry to address the aforementioned deficiencies and inadequacies.

SUMMARY OF THE DISCLOSURE

Embodiments of the present disclosure provide a system for managing the collection and delivery of goods using mobile computing devices. Briefly described, in architecture, one embodiment of the system, among others, can be implemented as follows. The system for managing the collection and delivery of goods using mobile computing devices has at least one processor and at least one non-transitory computer readable medium comprising instructions that, when executed by the at least one processor, cause a computing device to: receive, on a collection and delivery management system hosted on a centralized server, a request from a first user through an application on a first user computing device for a pick-up of at least one item from a first location; identify at least one second user of the collection and delivery management system capable of fulfilling the pick-up request; transmit details of the pick-up request to an application on a second user computing device of the identified at least one second user, wherein a visual map of the first location is displayed on a user interface of the second user computing device; upload at least one time-stamped, geo-located photograph of the at least one item to the application of the second user computing device; and upon delivery of the at least one item from the first location to a second location by the at least one second user, validate delivery of the at least one item by the first user computing device through at least one code identifier, wherein the at least one code identifier is transmitted from the collection and delivery management system to the first user computing device.

The present disclosure can also be viewed as providing methods of managing the collection and delivery of goods using mobile computing devices. In this regard, one embodiment of such a method, among others, can be broadly summarized by the following steps: receiving, on a collection and delivery management system hosted on a centralized server, a request from a first user through an application on a first user computing device for a pick-up of at least one item from a first location; identifying at least one second user of the collection and delivery management system capable of fulfilling the pick-up request; transmitting details of the pick-up request to an application on a second user computing device of the identified at least one second user, wherein a visual map of the first location is displayed on a user interface of the second user computing device; uploading at least one time-stamped, geo-located photograph of the at least one item to the application of the second user computing device; and upon delivery of the at least one item from the first location to a second location by the at least one second user, validating delivery of the at least one item by the first user computing device through at least one code identifier, wherein the at least one code identifier is transmitted from the collection and delivery management system to the first user computing device.

The present disclosure can also be viewed as providing methods of inputting delivery details into a computerized system for the collection and delivery of goods. In this regard, one embodiment of such a method, among others, can be broadly summarized by the following steps: visually analyzing, with a camera of a mobile computing device, at least one commercial receipt for the purchase of at least one item to optically recognize alpha-numeric characters on the at least one commercial receipt; inputting the recognized alpha-numeric characters on the at least one commercial receipt into data fields of the computerized system for the collection and delivery of goods; identifying, by at least one processor of the computerized system for the collection and delivery of goods, delivery data from the data fields, wherein the delivery data is associated with the collection and delivery and includes at least one of: a pick-up location; an item size; or an item quantity; and communicating, by the computerized system for the collection and delivery of goods, to at least one provider, a request for collection and delivery of the at least one item, wherein the request includes at least a portion of the identified delivery data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
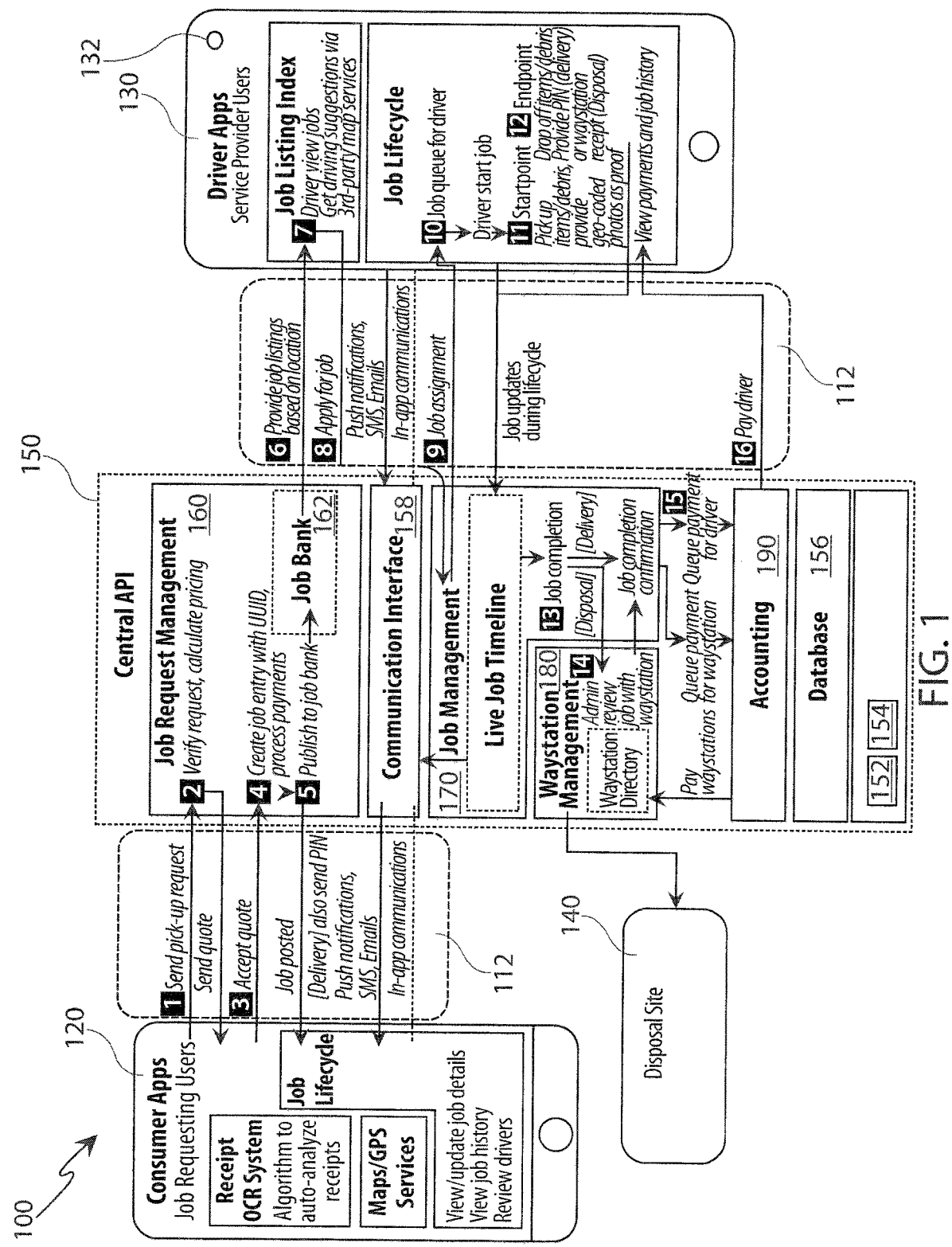
FIG. 1 is a schematic diagram of a collection and delivery management system, in accordance with the first exemplary embodiment of the present disclosure.

An appendix is included which shows various potential user interfaces of the disclosed systems and methods herein. These are only examples and do not limit the description or breadth of the described invention and embodiments.

DETAILED DESCRIPTION

To overcome the aforementioned deficiencies within the refuse collection industry and with the delivery of building materials and other goods by individuals who do not have vehicles capable of transporting such materials, the subject disclosure is directed to a system and method for collection and delivery of goods which utilizes modern wireless and computing technology to facilitate the management, collection, and delivery of goods. Specifically, with the advent of mobile computing devices with wireless communication, it is now possible to coordinate the efforts of discrete individuals to fulfill tasks customarily handled by organized, cohesive groups. From a waste collection perspective, using such a system allows for those in need of having refuse removed from their house or construction site to coordinate such a task efficiently and conveniently. From a goods delivery standpoint, this system can allow those in need of having goods delivered to a specific location to coordinate such delivery by other individuals with capable vehicles. Moreover, such an effort can be achieved at a relatively low cost compared to the conventional methods. For example, the costs of disposing of refuse, such as ordering a dumpster or removing bags of refuse, or the costs of renting a delivery truck and delivering building materials or other items can be substantially lowered with the system of management, collection, and delivery described herein.

Accordingly, the subject disclosure, in general overview, is directed to a method, system, and apparatus for coordinating the management, collection, and delivery of items, such as refuse items, but also other items which need to be delivered. The system utilizes a mobile application (app) that offers convenient collection and delivery service which can be used by corporate users and individual users. For example, the system may be used easily by building and renovation construction contractors, but also applicable to homeowners and other individuals who require assistance with removing refuse. The system further utilizes independent individuals who own vehicles which are capable of collecting and delivering goods, such as pick-up trucks or similar vehicles. The mobile application allows people who are in need of collection and delivery to request the assistance of those who are capable of picking up and delivering the goods. The system may include and be facilitated, at least in part, by a software application which is operable on mobile computing devices of the users and which interfaces with a central API. The end result is a system which harnesses the potential of individual truck owners who can assist with the collection and delivery of goods for individuals in need of assistance, all of which is managed through an easy to use, convenient, efficient, and cost-effective management system.

FIG. 1 is a schematic diagram of a collection and delivery management system 100, in accordance with the first exemplary embodiment of the present disclosure. The collection and delivery management system 100, which may be referred to herein simply as 'system 100' includes a centralized server 150 having a central application programming interface (API) which is in communication through a network 112 with one or more pick-up requesting devices 120 and one or more pick-up provider devices 130. The network 112 may include any type of capable communication network or combination of networks, including the Internet, wired or wireless communication networks, and cellular networks. The pick-up requesting and provider devices 120, 130 may include any type of mobile computing device, such as cellular phones, smart phones, PDAs, tablet computers, or other computing devices.

The pick-up requesting devices 120 may be characterized as the computing device used by an individual or corporate entity (requester) who is requesting collection and/or the collection and delivery of goods. Depending on the goods, the requester may only care about the collection of those goods, e.g., in the case of refuse where the requester simply wants the goods (refuse) to be removed and does not need to have input with or control over the location to which the goods are to ultimately be delivered. In another example, the requester may have a direct interest in where the goods are delivered, for example, when the requester is seeking delivery of goods he or she purchased at a store to his or her residence. The requester may be any individual who is requesting collection of goods.

Commonly, the system may be used for the collection and disposal of refuse by individuals who are unequipped, unable, or unwilling to handle the disposal of the refuse themselves. While the subject disclosure can be used with the collection and delivery of all types of goods, for clarity, the subject disclosure is described relative to the collection and delivery of refuse items. Accordingly, with the collection of refuse, the requester may include contractors, homeowners, or tradespeople who have construction or demolition waste, or other refuse that needs to be removed from the construction site, and are willing to pay a monetary fee to have the refuse collected from the site. The pick-up provider device 130 is characterized as the devices used by individuals capable of providing pick-up of the refuse bags for the requesters. Commonly, the pick-up providers are individuals with vehicles that are capable of picking up bags of construction refuse. These individuals may include pick-up truck owners or other vehicle operators who desire to use the system 100 to earn additional income by picking up the bags of refuse for the requesters. The pick-up provider devices 130 each include a camera which is capable of taking a photograph or similar image.

Additionally, as shown in FIG. 1, the system 100 includes disposal sites 140 which are the facilities which process waste and refuse. The disposal sites 140 may include general disposal facilities such as landfills, transfer stations, recycling centers, or similar facilities, or the disposal sites 140 may include specialized refuse disposal places, such as those that specialize in the disposal of certain construction waste. Disposal sites 140 may register with the system 100 such that information about the disposal site is provided to the system 100. For example, the disposal sites 140 may provide a name, address, and rate information about the costs for disposing of various products. Each disposal site 140 may be assigned a site code.

The server 150 may be a centralized server which is capable of processing and managing data received from the pick-up requesting and provider devices 120, 130. The server 150 includes a processor 152, a memory 154, a database 156, and a communication interface 158. The database 156 may be capable of storing the computerized and electronic data processed by the processor 152 of the server 150. The memory 154 may include any type of non-transitory memory. The communication interface 158 may facilitate communication between the server 150 and the network 112 through which the pick-up requesting and provider devices 120, 130 are connectable.

The server 150 may further include various modules or units for managing different aspects of the system 100, including a job request management unit 160, a job management unit 170, a disposal management unit 180, and an accounting unit 190. While the functioning of these units may be further understood relative to the method steps, as discussed below, the job request management unit 160 may be generally capable of coordinating the initial pick-up request when one is received from a pick-up requesting device 120. The job management unit 170 manages the process of picking up the refuse items and the disposal management unit 180 manages the disposal aspects of the system 100.

The system 100 may gather information about the users thereof, in particular, the requesters, the providers, and the disposal facilities. For example, the requester information may include the first and last name of the individual, a billing address, a payment type and the related information, such as relevant credit card, bank details, or bitcoin, etc., and contact information, such as the e-mail address and phone number of the individual. The information gathered from the providers may include the first and last name of the individual, his or her address, contact information such as e-mail address and cell phone number, the vehicle information of the provider, including vehicle type, license plate number, registration information, and insurance coverage information. The information about the provider may also include technical information about the provider's vehicle, including the class of the vehicle, e.g., ½ ton, 1 ton, 2 ton, etc., flat bed, raised bed, dump body, the weight rating for the vehicle, the towing capacity, etc. It is noted that portions of the information gathered by the system 100 may be retrieved from existing databases based on information provided by the individual. For example, the provider may give certain information about his or her vehicle, such as a VIN or other identifying information, which the system 100 can use to retrieve specific technical details about that vehicle, such as a weight rating. Accordingly, the system 100 may interface with various databases to allow the retrieval of certain information.

In use, a requester using the requesting device 120 may send a pick-up request to the job request management unit 160. The message is transmitted through the network 112 and into the server 150. The requesting message may include information from the requester, such as data about the number of bags to be picked up, the type of bags that the refuse is stored in, e.g., in 3 mil plastic trash bags, woven refuse bags, etc., and the type of refuse or debris, such as wood, tile, stone, brick, landscaping material, grass, shrubbery, logs, etc. The requesting message may also indicate the desired pick-up time, which may include the requester selecting an express pick-up (6 hour window), a normal pick-up (12 hour window), or a flexible pick-up (e.g., within X number of days). The requester may enter this information within the application operating on a requesting device 120 and submit the request to the server 150 once the information has been verified and/or approved by the requester.

During the submission process, the requester may be provided with alternatives and data about the pick-up options, such as costs, times, schedules, or other variables that may influence the specific details of the request.

Once the request is received in the server 150, it is verified and the pricing of the job is calculated. The quote for the job is then transmitted back to the requesting device 120 where it can be accepted by the requester at which point the job management unit 160 creates a job entry with a job code for the request. The job code may include a unique alpha-numeric code which represents the request, such as a unique 11-digit identification job code, also referred to as a user-unique ID (QUID). This job code may be keyed to the request for the duration of the process, such that the job code controls or is used to manage the pick-up of the refuse and disposal of the refuse. Once the job code is generated, the job management unit 170 may query for available providers to fulfill the request. For example, the job management unit 170 may run a search for all possible providers located within a certain distance of the requester's pick-up address and/or a possible disposal facility 140, or registered to a specific zip code. The potential options for providers may then be narrowed by various criteria, such as availability within the requester's time frame, ability to transport the quantity/weight/type of refuse, or other criteria. When the query to providers is initiated, the server 150 may also send a confirmation message to the requesting device 120 indicating that the request has been received and a provider is being located.

After the desired pool of providers is identified, the job is published to the job bank 162 and the server 150 transmits an alert message to the pool of providers to alert them of the potential job. Each provider may then view the specific details of the job, e.g., requester's site information and debris details, and use the provider device 130 to apply for the job, or to accept or decline the job. Commonly, the first provider to accept the job will be assigned to that pick-up job, but the server 150 may choose other providers as well, such as those who are more capable of fulfilling the job tasks within the requested time frame. Once the provider is identified, the communication interface 158 of the job management unit 170 may send a second message to the requesting device 120 to notify them of the provider who is assigned to the job and the estimated time of pick-up. The notification may also include other information about the provider, such as a photograph of the provider, information about their vehicle such as a vehicle license plate, vehicle type, color, etc., contact information for the provider, or other relevant information. When the provider is matched to a job, the server may generate a code identifier, such as a PIN, a bar code, QR code, or similar code, which the provider will use to confirm and close out the job, for example, to indicate that pick-up of the refuse and final delivery thereof to a disposal site has occurred. Similarly, when the delivery of goods occurs from a pick-up site to a drop-off site, the code identifier can be used by the requester to indicate that the delivery is completed.

Next, the provider arrives at the location identified in the request to pick-up the refuse. In some situations, the requester may verify the identity of the provider by comparing the photograph or vehicle information previously sent by the system to the provider, whereas in other situations, the requester may not be present when the provider arrives, e.g., when the bags with refuse are left curbside and the requester is not present at the location. Prior to loading the bags of refuse on his or her vehicle, the provider may provide the server 150 with their GPS location to confirm the correct address. The provider may also take photographs with a camera 132 of the provider device 130 of the bags of refuse to capture images of the refuse bags. These photographs are transmitted to the server 150. At the server 150, the job management unit 170 may add the unique job code to the photographs and attaches them to the pickup request. Accordingly, assignment of the job code to the photographs themselves, e.g., by overlaying the job code on the digital photograph or otherwise embedding, preferably visually, the job code to the digital file of the photograph, allows the unique job code to be clearly paired with the refuse bags themselves, which can later be used to identify the refuse bags, if necessary. For example, pairing the job code to the photographs may allow for identification of the refuse bags if they are not disposed of properly or if there is a dispute about the size, quantity, or materials therein.

Next, the provider loads the bags of refuse into his or her vehicle. Once loaded, the provider may confirm pick-up with the requester, such as by transmitting a message or otherwise providing confirmation to the requester that the refuse bags have been picked-up. The requester may then review the provider, the system, or other aspects of the transaction with the application, such as by leaving a rating, a written review, or other feedback using the application. The provider determines potential disposal sites 140 for disposing of the refuse bags through use of the provider device 130 in combination with the disposal management unit 180 of the server 150. For example, the disposal management unit 180 may maintain a directory of disposal facilities which can be recommended or identified for disposal. The directory may be organized by state, city/town, zip code, refuse materials accepted, costs, convenience, or other criteria. These disposal sites 140 are registered with the server 150, such that the disposal process from the provider is efficient and the billing for the disposal can be handled directly between the disposal site 140 and the server 150. For example, registration of the disposal sites 140 may include identification of the costs and methods for disposal of various items, such that the provider is able to quickly deliver the refuse bags without disorganization.

When the provider arrives at the disposal site 140, the provider may provide the disposal site 140 the job code previously assigned to the job. This may include the provider entering the job code at the entrance of the disposal site 140, manually, automatically, etc., which may immediately notify the disposal site 140 of the refuse items to be delivered. Additionally, the server 150 may be capable of sending the disposal site 140 an advanced message about an incoming delivery of refuse items, such that the disposal site 140 has advanced notice of the transaction and can prepare accordingly. The bags of refuse items are then removed from the provider's vehicle and left with the disposal site 140. The provider may then indicate to the server 150 that the job has been completed, and the disposal site 140 may indicate to the server 150 receipt of the refuse items along with the job code. This may confirm completion of the transaction. At this point, a log of the costs of the transaction can be finalized such that appropriate payment from the requester can be finalized. Subsequently, the server 150 may issue payment to the provider and the disposal site 140, which may occur in batches at predefined times, such as monthly or weekly.

There are many variations of the system 100, all of which are included within the scope of the present disclosure. For example, the system 100 may rely on specific bags for use with containing the refuse which can be sold at specific stores. These stores may have promotions with customers who purchase the bags to receive a discount towards a pick-up transaction. The store, in turn, may receive a referral fee. It is also noted that the application used by the requester may include other functionality and features, such as a feature to allow a requester or provider to file a complaint with the system if there is a problem during the transaction. For example, if there is an accident with the provider during the transport, the provider may use the application to file a complaint or an insurance request with the system. Similarly, the application may allow for the requester to file a complaint with the system if a problem occurs. This feature may include the ability for the requester and/or the provider to include a photograph of the bags with refuse, textual explanation, video, or other evidence relevant to the complaint.

Additionally, there are many variations on the particular goods or items to be collected or delivered. One primary example is when the system 100 is used for the collection and delivery of goods that are newly purchased by the requesters, such as large items purchased at stores which the requesters cannot themselves deliver to their house or another desired location. For instance, lumber, appliances, large building supplies, recreational and exercise equipment, and other similar products which often do not fit within sedans and similar vehicles. The system 100 may be used by the requester to manage the collection and delivery of these items in a similar manner as described with the collection of refuse with the notable exception that the items are collected from a location identified by the requester, commonly the place of purchase, and delivered to a location identified by the requester, not to a disposal site.

Figure 2:
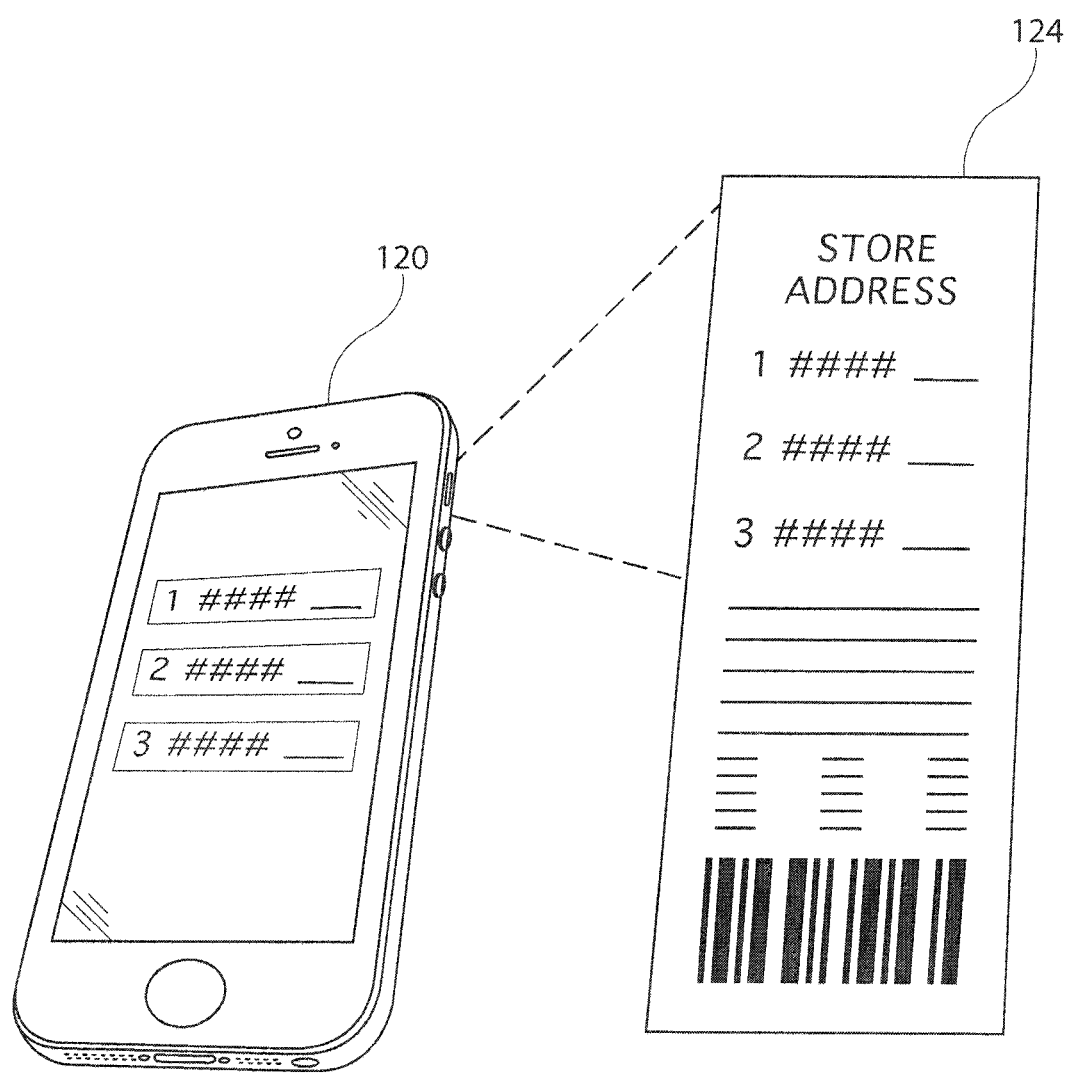
FIG. 2 is a diagrammatical illustration of a requester device using the OCR unit to auto-analyze a receipt.

In use, the system 100 may have the same functionality as previously described with the exception that the endpoint of the job is the address identified by the requester. In turn, the job request unit 160 calculates the pricing of the job based on the pick-up and delivery addresses provided by the requester. Additionally, when a requester uses the system 100 for the collection and delivery of items that are newly purchased by the requester, the system 100 may use the requester's receipt to gain information about the job. For example, when the requester makes the purchase at the store, he or she can use a receipt optical character recognition (OCR) unit within the application on the requester device 120 to read the characters on the receipt. FIG. 2 is a diagrammatical illustration of a requester device 120 using the OCR unit to auto-analyze a receipt 124. As shown in FIG. 2, the receipt OCR unit may scan the information on the receipt 124 and populate it into the pick-up request sent to the job request management unit 160. This information may include the location of the purchase, i.e., the pick-up location, the goods purchased, including any associated SKUs, the number of items purchased, as well as any other relevant information. The job request unit 160 of the server 150 may process this information using algorithms to aid in calculation of the price of the collection and delivery. For example, the SKU of the items on the receipt 124 may be used to identify the physical characteristics of the product, such as the size and weight, through a database or $3^{rd}$ party information repository, which can be combined with the quantity purchased to determine the exact spatial requirements of the goods. Additionally, the information on the receipt 124 can provide other information about the goods, such as restrictions of transportation or use, material hazards, etc.

Figure 3:
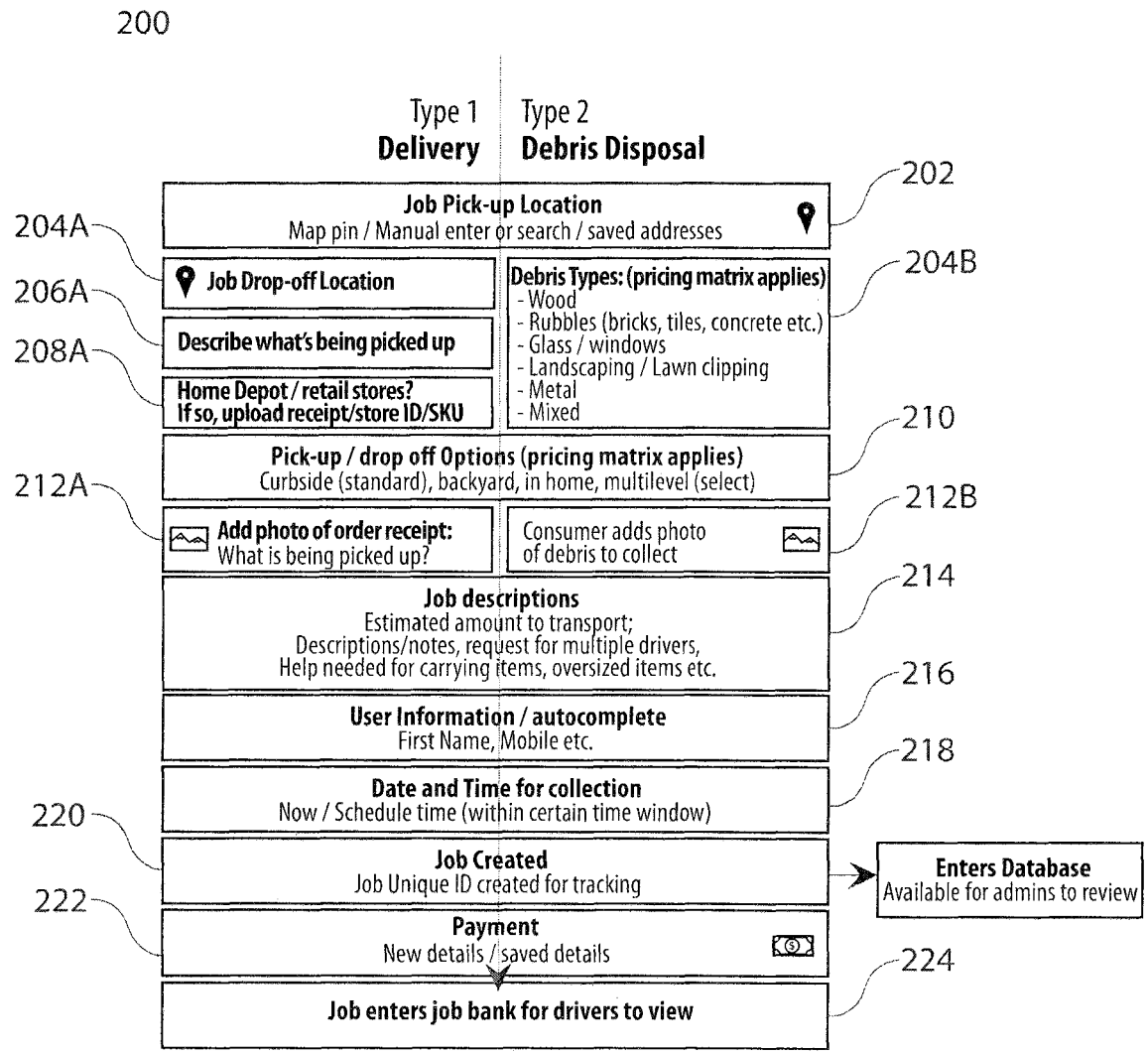
FIG. 3 is a schematic flowchart of the creation of a job using the collection and delivery management system, in accordance with the first exemplary embodiment of the present disclosure.

FIG. 3 is a schematic flowchart 200 of the creation of a job using the collection and delivery management system 100, in accordance with the first exemplary embodiment of the present disclosure. As shown, the flowchart 200 describes many of the steps and operations for creating a job using the system 100 for both delivery of goods (type 1) and collection and disposal of goods/refuse (type 2). In either situation, a job pick-up location is identified at block 202. The job pick-up location may be determined from a map pin, a manual entry by the requester, a search for an address, or from a saved address. When the job is for delivery of goods (not disposal), the job drop off location is provided by the user (block 204A), the items or goods being picked up are described (block 206A) and, if purchased at a retail store, an image or OCR analysis of the receipt can be uploaded to the system (block 208A). If the job is to dispose of refuse, the type of refuse is provided by the requester (block 204B). At block 210, the pricing for the job is determined, where the pick-up/drop-off options can be selected. These may include pick-up/drop-off at curbside, backyard, in home, multilevel, etc. At block 212A, the requester uploads a photo of the receipt of their purchase, and for disposal, the requester uploads a photo of the goods or refuse to be disposed of. At block 214, the job description is provided by the requester, where he or she specifies the estimated amount to transport, descriptions/notes of the goods, a request for multiple drivers, and whether help is needed to carry the items. At block 216, the requester provides his or her information, including a name and contact information. At block 218, the requester determines or reviews the date/time for collection, which may include collection times occurring at the present or scheduled in the future within certain windows of time. At block 220, the job is created along with a unique job ID. At block 222, the payment information for the job is collected, and then the job enters the job bank for providers to view (block 224).

Figure 4:
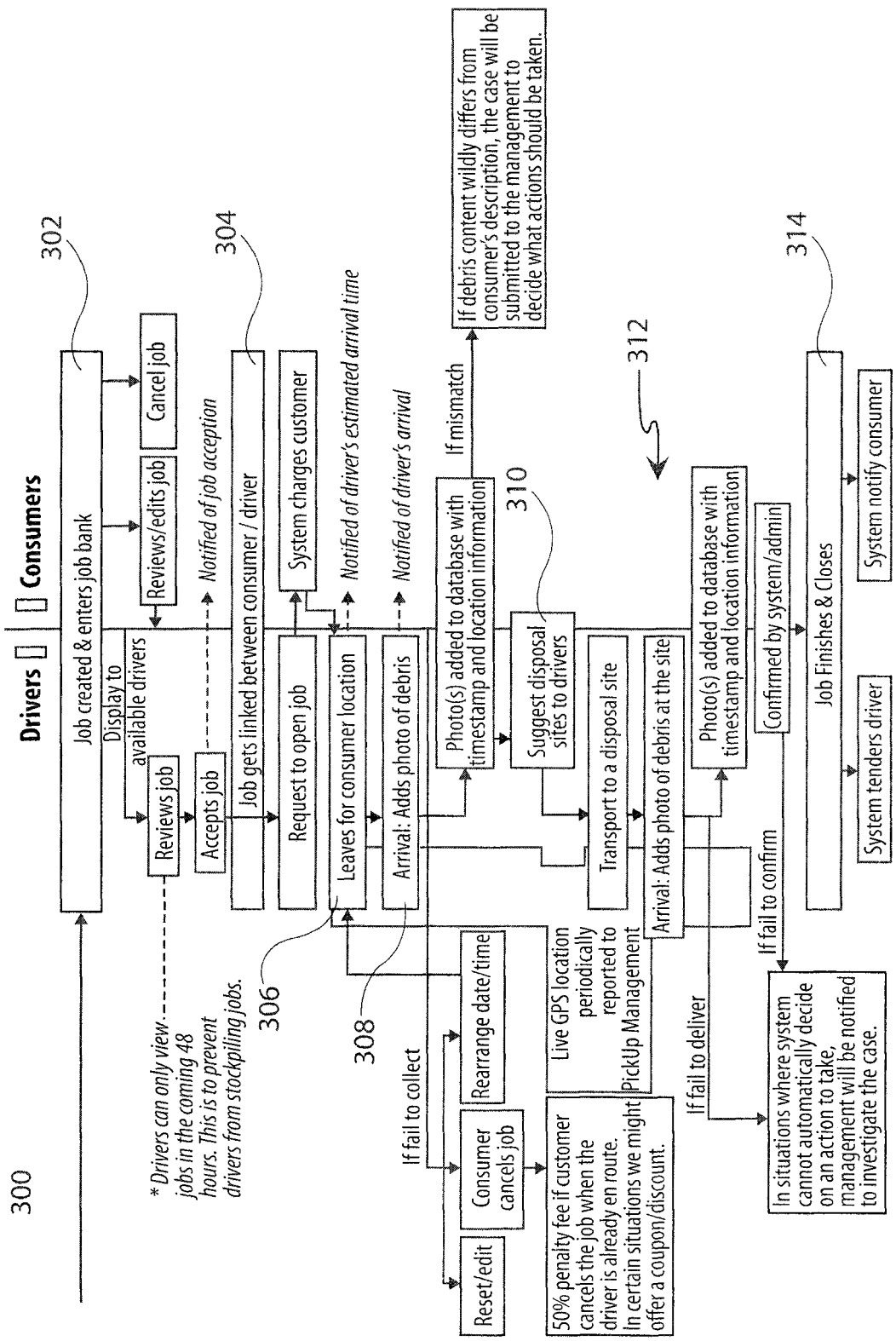
FIG. 4 is a schematic flowchart a disposal job lifecycle using the collection and delivery management system, in accordance with the first exemplary embodiment of the present disclosure.

FIG. 4 is a schematic flowchart 300 of a disposal job lifecycle using the collection and delivery management system 100, in accordance with the first exemplary embodiment of the present disclosure. As shown, the lifecycle of a disposal job is shown from both the perspective of the provider (the driver) and the requester (the consumer). First, the job is entered and it is submitted to the job bank (block 302), where the consumer can cancel the job or can review and/or edit the job as necessary. In the job bank, the job is displayed to the providers, who can review and ultimately accept or reject the job. Once the job is accepted by a provider, the job is linked between that specific provider and the requester (block 304). Upon acceptance, the system 100 charges the requester the price for the job and the provider can leave to start the pick-up process (block 306). The requester can be provided with the provider's estimated arrival time. Once the provider arrives, he or she takes photos of the refuse/debris and adds them to the database of the system 100 along with a timestamp and location information (block 308), e.g., geo-located information of the specific place where the photo was captured using GPS or similar geo-locating technology. If the items to be picked-up differ substantially from the requester's description, the job will be submitted to management to decide what further action should take place (e.g., increase in price, denial of the job, etc.). After the refuse items are loaded into the provider's vehicle, disposal sites are suggested to the provider (block 310). The items are transported to the disposal site where additional photos of the items are taken along with timestamp and geo-location information (block 312). The timestamping and geo-location information of the photos ensure that there is proof that the items are delivered. Once delivered, the job is closed (block 314).

Figure 5:
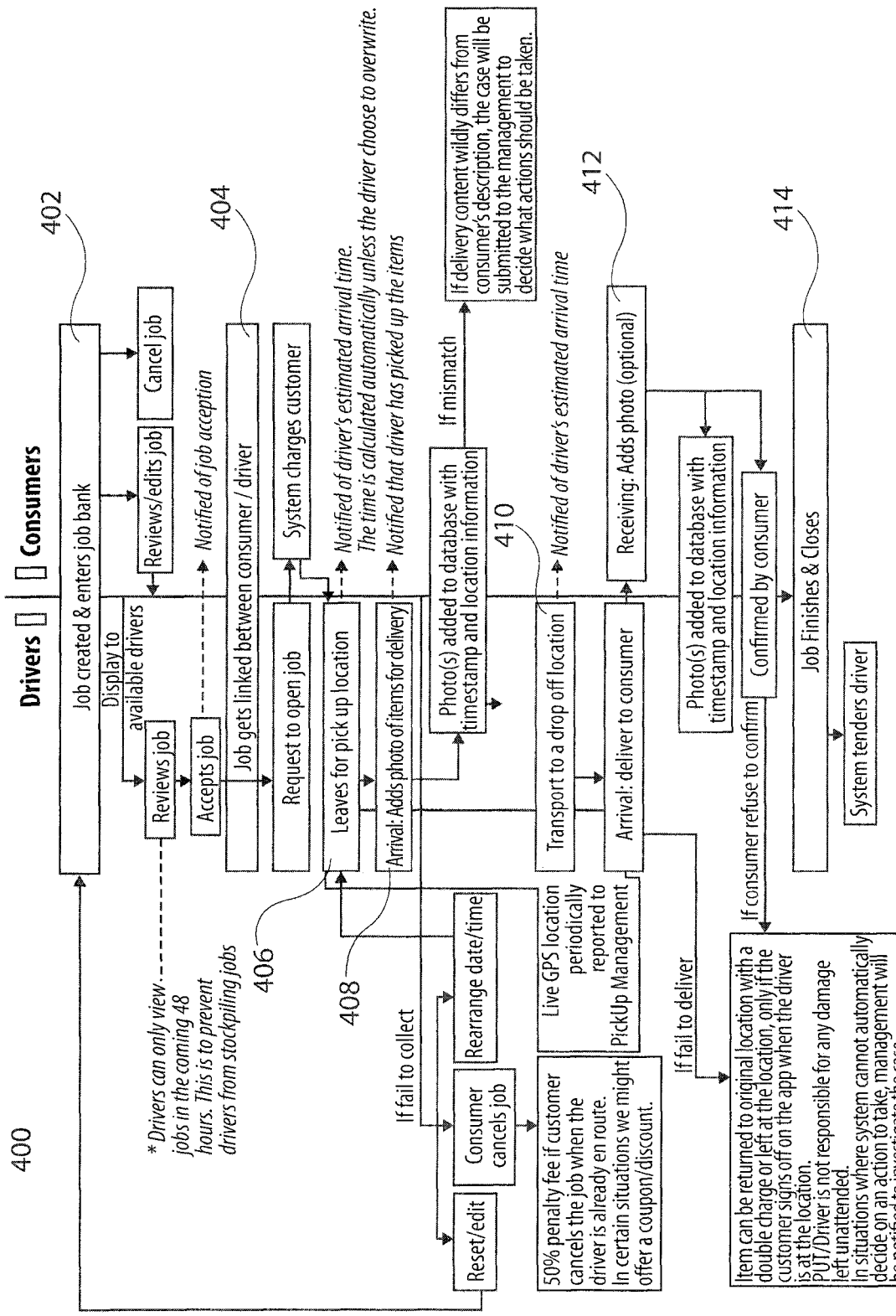
FIG. 5 is a schematic flowchart a delivery job lifecycle using the collection and delivery management system, in accordance with the first exemplary embodiment of the present disclosure.

FIG. 5 is a schematic flowchart 400 of a delivery job lifecycle using the collection and delivery management system 100, in accordance with the first exemplary embodiment of the present disclosure. As shown, the lifecycle of the delivery job is shown from both the perspective of the provider (the driver) and the requester (the consumer). First, the job is entered and it is submitted to the job bank (block 402), where the consumer can cancel the job or can review and/or edit the job as necessary. In the job bank, the job is displayed to the providers, who can review and ultimately accept or reject the job. Once the job is accepted by a provider, the job is linked between that specific provider and the requester (block 404). Upon acceptance, the system 100 charges the requester the price for the job and the provider can leave to start the pick-up process (block 406). The requester can be provided with the provider's estimated arrival time. Once the provider arrives, he or she takes photos of the items to be collected and delivered and adds them to the database of the system 100 along with a timestamp and location information (block 408), e.g., geo-located information of the specific place where the photo was captured using GPS or similar geo-locating technology. If the items to be picked-up differ substantially from the requester's description, the job will be submitted to management to decide what further action should take place (e.g., increase in price, denial of the job, etc.). After the items are loaded into the provider's vehicle, the provider drives to the delivery location (block 410). The items are then unloaded where optionally, additionally photos can be taken and uploaded to the system with the timestamp and the geolocation information (block 412). The timestamping and geo-location information of the photos ensure that there is proof that the items are delivered. Once delivered, the job is closed (block 414).

Figure 6:
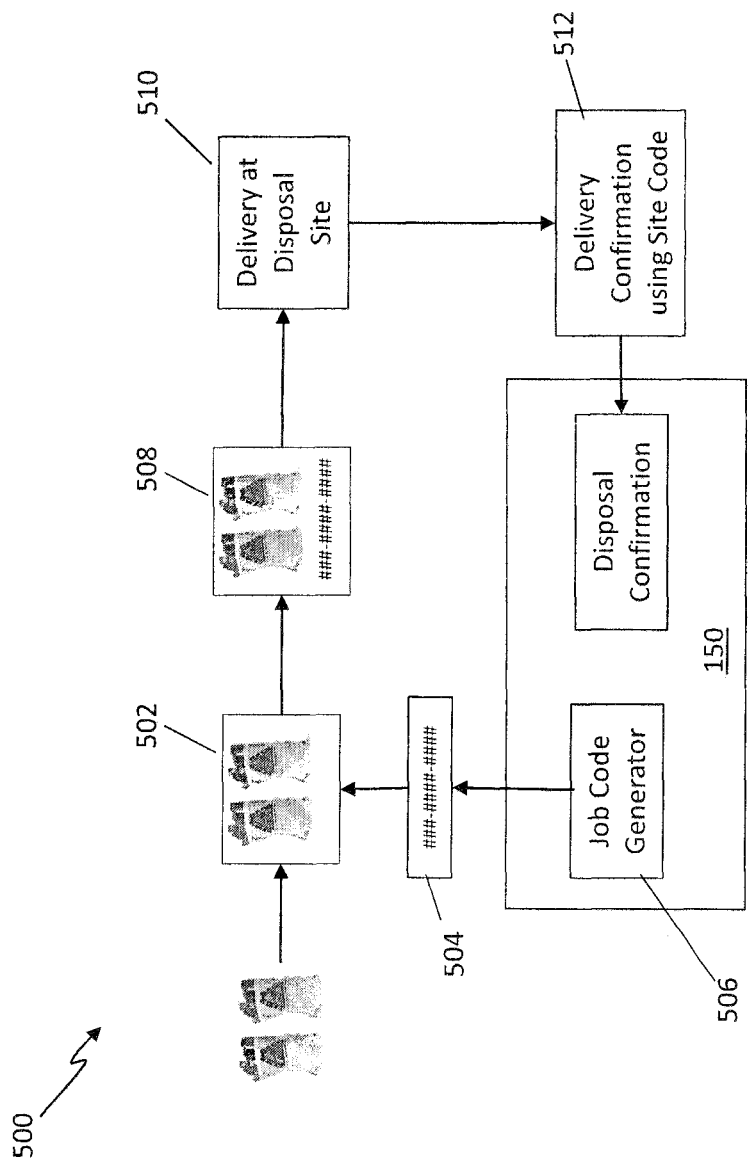
FIG. 6 is a schematic diagram of the collection and delivery management system of FIG. 1, in accordance with the first exemplary embodiment of the present disclosure.

FIG. 6 is a schematic diagram 500 of the collection and delivery management system 100 of FIG. 1, in accordance with the first exemplary embodiment of the present disclosure. In particular, FIG. 6 illustrates the process of applying the job code to the photograph taken by the provider. As shown at block 502, the photograph is taken by the provider on his or her providing device (130 in FIG. 1). The job code 204 is generated within a job code generator 506 within the server 150, as previously described. The job code is then added to the photograph (block 508), which preferably includes visually adding the job code to the photograph such that one is capable of reading the job code while looking at the photograph. Other techniques for adding the job code to the photograph may also be used, such as embedding the code or otherwise incorporating the code into the digital information of the photograph. At block 510, the delivery of the refuse items to the disposal sites occurs where the disposal site may confirm delivery using the job code (block 512). Confirmation may be sent back to the server 150 to record completion of the job.

Figure 7:
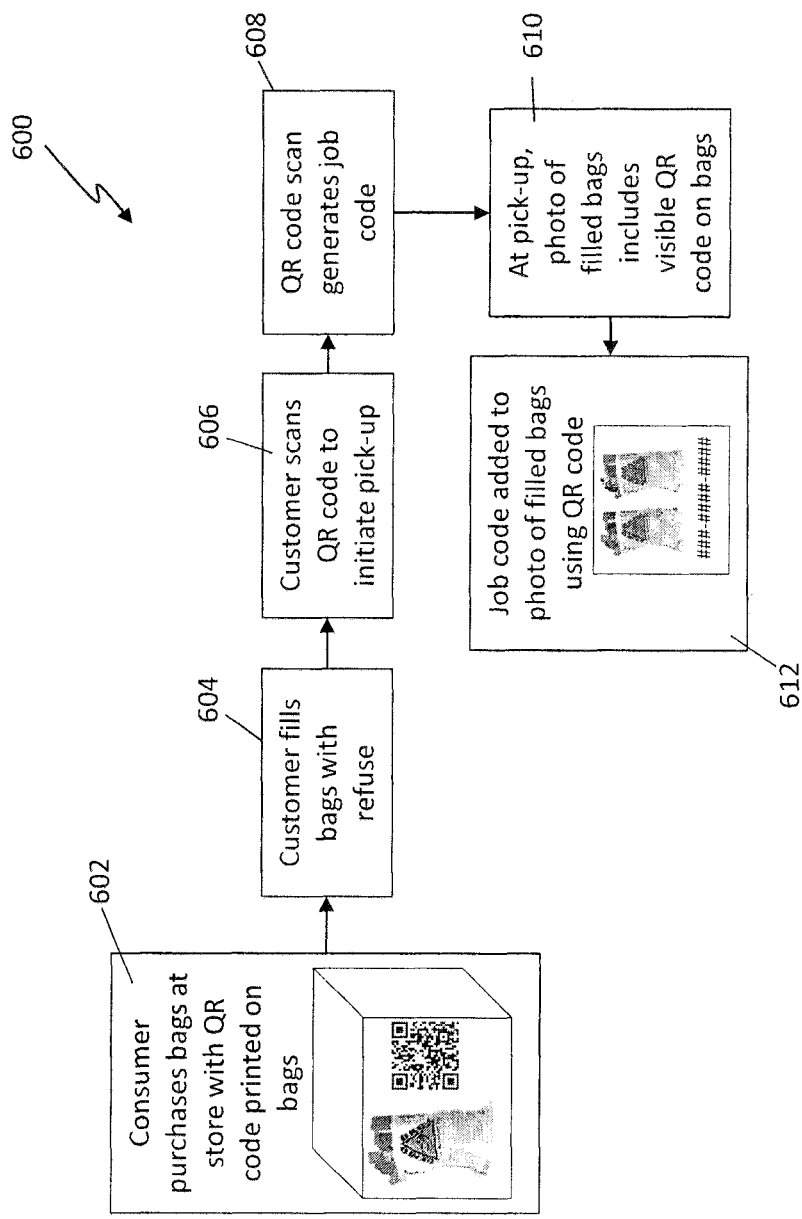
FIG. 7 is a schematic diagram of the collection and delivery management system of FIG. 1, in accordance with the first exemplary embodiment of the present disclosure.

FIG. 7 is a schematic diagram of the collection and delivery management system 100 of FIG. 1, in accordance with the first exemplary embodiment of the present disclosure. In particular, FIG. 7 illustrates a process 600 of using a QR code to identify a pick-up job with the purchase of bags at a store. As shown at block 602, the bags used for collecting and containing the refuse may be sold in stores for consumer purchase. The customer may bring the bags to the site and fill them with refuse (block 604). Once the customer/requester is ready for the bags to be picked up, he or she may scan a code (block 606), such as a QR code, which is printed on the bags themselves, which may initiate an action in the server (FIG. 1) to start the pick-up process, as described relative to FIG. 1. For example, as indicated at block 608, the scanning of the QR code may generate the job code within the server. At block 610, the bags may be picked up by the provider where the photograph he or she takes of the bags includes a visible image of the QR code on the bags. Then, the job code can be added to the photograph of the bags with the QR code (block 612). The use of the QR code printed on the bags themselves may act to better coordinate which bags correspond to which job, such that even if the visual image of the bag is altered, it is still possible to obtain an identity of the bag. Additionally, keying the bags themselves to the job may provide enhanced recordkeeping of where bags are purchased, such that greater incentives or promotions can be directed to stores with the greatest volume of sales.

Figure 8:
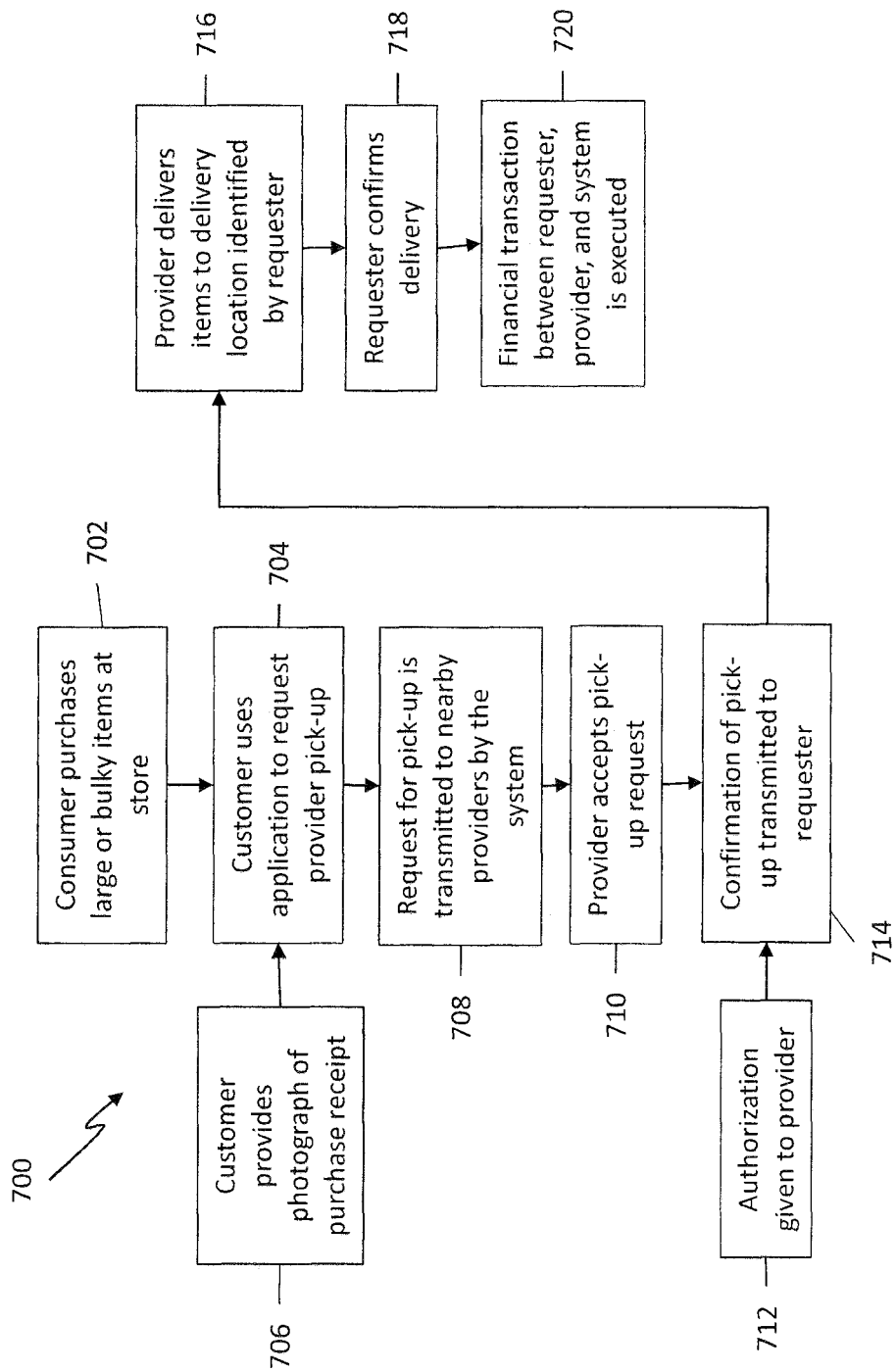
FIG. 8 is a schematic diagram of the collection and delivery management system, in accordance with the first exemplary embodiment of the present disclosure.

FIG. 8 is a schematic diagram of the collection and delivery management system 100, in accordance with the first exemplary embodiment of the present disclosure. In particular, FIG. 8 illustrates a process 700 of using the system 100 to collect and deliver items purchased from a store, as described relative to FIGS. 1 and 5 herein. As previously discussed, a requester can request a provider's assistance in collecting products from a remote site and deliver them to a location identified by the requester. For example, an individual who purchases lumber, sheets of plywood, drywall, heavy items, appliances, or other large items from a hardware store but does not have a vehicle to transport the products to his or her house may use the system to request a provider to transport the materials. The requester may use the system as previously described but may specify the location of the pick-up, e.g., at a particular store address, at a particular department or door of the store, etc., and a pick-up time. After, or prior to, in some situations, the requester purchases a large or bulky item at a store (block 702) he or she may use the application to request a provider pick-up (block 704). The requester may further include a photograph of the receipt of their purchase which is transmitted through the application to the provider to indicate the quantity and type of materials needing to be picked up (block 706). The request for pick-up is transmitted by the application to nearby providers (block 708) and one of the providers accepts the pick-up request (block 710).

When the provider arrives at the store or place of pick-up, he or she may provide the store or the requester with authorization for the pick-up, such as by showing the store a copy of the receipt or providing other identifying information, such as a telephone number, a driver's license number, identification, etc. This authorization may be given to the provider by the requester (block 712) or it may be handled by the store's management system, such as a customer service department or in-store pick-up system. Additionally, the requester may also be present when the pick-up occurs, such that requester coordinates the pick-up without the need for authorization by the store. Once authorization is complete, confirmation of pick-up of the items may be transmitted through the application to the requester (block 714). Next, the provider delivers the items to the delivery location identified by the requester (block 716) and the requester confirms delivery (block 718). Confirmation may include the requester agreeing that the items were delivered in an undamaged state and the requester may use the application to rate and/or review the provider, as previously discussed. The financial transaction between requester, provider, and system may then be processed to finalize the transaction. It is noted that payment for the pick-up may occur at other times during the process, such as before pick-up. Other variations to this process, including any of the steps, functions, or features disclosed relative to another figure, may also be included with the process of FIG. 8.

Figure 9:
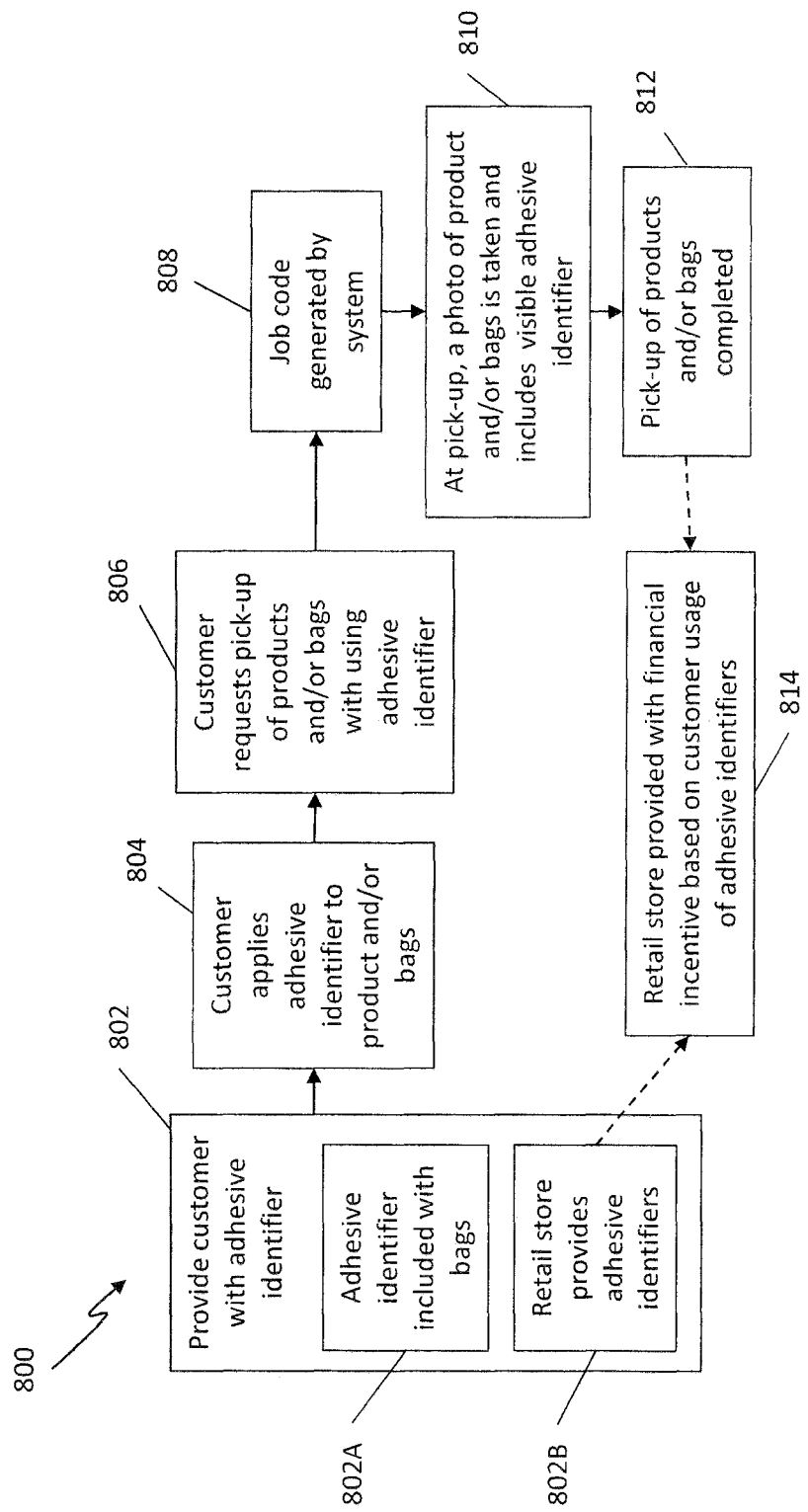
FIG. 9 is a schematic diagram of the collection and delivery management system, in accordance with the first exemplary embodiment of the present disclosure.

FIG. 9 is a schematic diagram of the collection and delivery management system 100, in accordance with the first exemplary embodiment of the present disclosure. In particular, FIG. 9 illustrates a process 800 of using an adhesive identifier to identify a pick-up job for a product at a store or for refuse items within bags. The adhesive identifier may include an adhesive-based label or tag which can be applied to or affixed to a product or an exterior of a bag which appropriately identifies the product and/or bag with an identification metric. For example, the adhesive identifier may include one or more stickers which can be peeled off a release backing and adhesively connected to the product and/or bag. The identification metric may include any type of identifier, including an alpha-numerical identifier, a QR or bar code, or other means of identifying information.

As shown at block 802, the customer is provided with an adhesive identifier. This may include the adhesive identifier (or a plurality thereof) being included within the packaging of a product purchased by the customer. For example, a customer purchasing durable bags for refuse collection may be given a plurality of adhesive identifiers within the packaging that the bags are sold in, as noted at block 802A. In one of many alternatives, a retail store may provide a customer with adhesive identifiers, as shown in block 802B. In this example, the retail store may give customers adhesive identifiers when they purchase products at the store, especially those that the customer may require assistance transporting. For example, a customer who purchases lumber may be given adhesive identifiers which can be used with the system to arrange pick-up and transport of the lumber. At block 804, the customer applies the adhesive identifier to the product and/or bags. Again, if the adhesive identifiers are used with products, it may generally mean they're being used to assist with transportation of the products from a retail store to the customer delivery location. If the adhesive identifiers are used on refuse bags, as described previously herein, it may indicate that they're being used to assist with pick-up and disposal of refuse from a customer's location.

A block 806, the customer may use the system, as previously described, to request a pick-up of the products and/or bags to which the adhesive identifiers are used with. Then, the system may generate a job code (block 808). At pick-up, a photo of the product and/or bags is taken which includes the visible adhesive identifier (block 810). The photo with the adhesive identifier visible therein, may key the identifier to the product and/or bags, as previously described. Then, at block 812, the picked-up products and/or bags are delivered to the desired location and the job is completed. It is noted that the retail store may be provided with a referral fee or other financial incentive based on the customer usage of the adhesive identifiers, as shown at block 814. For example, a retail store may be given a certain percentage of the income derived from a pick-up job.

In some situations, the identity metric of the adhesive identifier may be keyed to a particular store chain, a particular retail store franchise or location, or other characteristics of the job to be completed. For example, when the adhesive identifier contains identifying information about the particular store location from where the adhesive identifier originated, when the adhesive identifier is scanned into the system, the system may automatically recognize the retail store location. This information can be used to provide further incentives, increase sales and/or product distribution in certain areas, or otherwise improve the successfulness of the system.

Further, it is noted that the use of adhesive identifiers can provide a particular benefit when used with refuse bags, and in particular, refuse bags constructed from woven polyethylene terephthalate (PET) or recycled polyethylene terephthalate (RPET). These woven, plastic-based bags can be difficult to print intricate identifiers on, due to the woven construction and the relative flexibility and movement between the individual strands of woven materials. Thus, while it is possible to print larger branding and logo information, printing a bar code or QR code, or other data to be scanned based on precise spacing, can be difficult. Using adhesive identifiers may overcome this problem by allowing for scanable codes and identifiers to be applied directly to the bags. Thus, a user can still benefit from the durability of the woven PET or RPET bags while the system can easily recognize the identity metrics of the adhesive identifier. Similarly, the use of adhesive identifiers allows for the application of these identifiers after a bag has been filled with refuse items, which means that the process of filling the bag does risk damaging an identifier for the bag. For example, when bags are used in very dirty applications, the dirt, dust, or other materials can interfere with identifiers printed on a bag. By allowing the customer to apply the adhesive identifiers after the bag is filled, there is no risk to damaging the identifying information of that identifier, which in turn, improves the usability of the system.

While the pick-up providers may commonly be individuals with vehicles that are capable of picking up bags of construction refuse or delivered goods or services, such as items purchased from home improvement stores, where the individual uses his or her own vehicle, it is also possible to use automated or autonomously-operated vehicles. These vehicles may be referred to as driverless, self-driving, or robotic vehicles, and they may function through the use of various hardware and software components which allow the vehicle to operate without active human control. The autonomously-operated vehicles may include hardware components such as radar, laser light, GPS, odometry, and computer vision to act as sensors for sensing the environment of the vehicle's operation. These hardware components may be connected to a centralized vehicle computer which processes the data sensed by the sensors. The centralized vehicle computer may include a processor, a memory, and other computing components. The processor may execute instructions from software stored on the memory, where the software outputs instructions to the drive components of the vehicle, including the drive train system, brake system, communications, etc. The software may include advanced control systems to interpret sensory information to identify appropriate navigation paths, as well as obstacles and relevant signage. The processing allows the control systems to be capable of analyzing sensory data to distinguish between different cars on the road, objects on the road, other cars, and other sensory data which can affect the vehicle's operation.

In se with the system, as previously described, the autonomously-operated vehicle may be in communication with the application to allow the vehicle to be requested to pick up objects, such as bags of refuse, or deliver objects from a location, such as delivered goods purchased from a store such as a home improvement store. For example, upon receiving a pick-up request from a user, the application may send a request pick-up instruction to the vehicle with the address, pick-up time, or other details of the pick-up. This pick-up instruction may be a stand-alone instruction or it may be combined with other requests and organized into a route or optimized schedule for the vehicle. Once the vehicle arrives at the location, the application may communicate with the requester to notify them that the vehicle has arrived. The user or requester of the pick-up may then load the objects into the vehicle. Optionally, the vehicle may include a scanning, or identification component which allows for the sensing of the objects when they're placed within the vehicle. For example, the vehicle may use RFID tags, bar codes, or other scanned codes to recognize the number of bags or objects loaded into the vehicle. The vehicle may optionally have a scale or weighing platform to detect the weight of the objects. Other sensors may also be used, such as visual or textually-input sensors which allow for e monitoring of the objects, or allows a user to input specific information into the system via the vehicle.

Once loaded, the vehicle may drive to another stop for additional pick-ups or it may drive to a disposal facility to dispose of the goods. When at the disposal facility, the vehicle may indicate to the disposal facility that it has arrived, e.g., such as by sending an electronic message through the application, by being sensed by a drop-off system at the disposal site, or by other functionality. The objects inside the vehicle may be unloaded and the job confirmation can be completed. This confirmation may include weighing the vehicle to detect the decrease of weight from the removed objects, visually sensing the objects in the vehicle, or other rise ensuring that the job has been completed.

The use of autonomously-operated vehicles may further include any of the components, systems, devices, and/or functionality disclosed within this application relative to the figures or otherwise, all of which is considered within the scope of the present disclosure as it pertains to the use of autonomous vehicles.

In a variation of the system and method disclosed herein, it is possible to utilize the same framework and network of individuals and/or autonomous vehicles for picking up and delivering materials, goods, and items for other activities. For example, the plurality of pick-up providers may further be used to perform services for individuals who can request them through the system, where the services may include household or labor tasks. In one example, the services can include lawn mowing, landscaping, snow plowing, handyman services, labor services, or other services which can be requested through the system. Additionally, the services can include other delivery or collection services outside of traditional refuse. For example, the system and methods disclosed herein may be used for the collection of food waste products and other biodegradable or compostable products from restaurants, grocery stores, food preparation facilities, and other venues which have food waste products which are in need of disposal. The system and method herein may be used with companies or $3^{rd}$ parties who specialize in recycling of these materials, such as, for example, Regreen Organics, Inc. of Fulton Md. In other examples, the subject invention may be used with the delivery, collection, and/or disposal of other biodegradable items, such as coffee grinds, animal feed, landscaping debris, or any other substances.

As a working example, an individual user may make a request with the system to receive bids on a particular task which the requesting individual seeks to have completed. The requesting individual may explain in detail the job or task they would like done by inputting information into the system through their computing device. The user may also upload additional information, such as pictures of a setting, dimensional drawings of a lawn, driveway, etc., or any other information which can help provide context to the extent and specifics of the job. Once submitted, a plurality of providers may be able to review the job and determine if it is within their skillset and timeframe. Then, a provider may accept a job through the system, which provides a notification to the requesting user about the job status. The monetary value of the job may be determined by either party, as the requesting user may specify an amount or range they're willing to pay, or the provider may bid on the job where the lowest bid is accepted. Any of the other functions, structures, or variations described within this disclosure may also be used with this alternative or modified use of the system and method, all of which are considered within the scope of the present disclosure.

It should be noted that any process descriptions or blocks in flow charts should be understood as representing modules, segments, portions of code, functions, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Further details on one particular embodiment of the collection and delivery management system 100, as described herein, are provided in the Appendix, the entirety of which is included within the scope of the present disclosure. In particular, the Appendix provides screenshots or screen grabs of the user interface of the system 100 embodied within an application on a mobile computing device. Within the Appendix, screenshots #1 through #37 depict the user interface from the requester point of view and screenshots #37 through #51 depict the user interface from the provider point of view.

With reference first to screenshot #1, the requester who seeks to use the system 100 to request a collection and delivery of goods, or requests collection and disposal of unwanted refuse, will first be presented with a log-in screen where the requester registers with an e-mail address and password. First time requesters can sign up for an account, existing requesters can login to an account already created or request assistance with their password, and other users can sign up to become a driver/provider. Once the requester has logged into the system, he or she may post a new job by clicking on the corresponding selectable field within the user interface (UI), as shown in screenshot #2. When a requester has previously used the system, their information may already be populated within the system and when a requester is using the system for the first time, they may be required to enter the information. Information of the requester can be edited accordingly, using the UI functions depicted in screenshots #4 and #5. In particular, screenshot #5 allows the requester to upload a photo of him or herself such that he or she can be recognized by the provided using the system.

As shown in screenshot #3, the requester (Ms. Michelle) has multiple delivery possibilities created for her account, each assigned a corresponding job number or reference code. For example, in the top delivery option, the requester is seeking a delivery of goods (4×10 foot wooden planks, Glazed door, Screws, Cables) from a first address in Honolulu, Hi. to a different address in Honolulu, Hi., which has been assigned number #DD9A992180730. The requester has selected the date of July $30^{th}$ and the requester has uploaded a photo of the goods to be delivered. The process of inputting the information for the delivery is described relative to screenshots #6 through #25. Turning to screenshot #6, the requester has input the address for the pick-up, and in screenshot #7, a graphical or visual map of the address is shown to the requester such that they can verify and confirm the correct pick-up location. In screenshot #8, the type of job can be selected by the requester, e.g., to specify whether the job is a delivery of goods from one location to another or if the job is a collection and disposal of debris or refuse. In screenshot #9, the requester must provide information about the goods to determine whether they would be hazardous. If the goods are hazardous, the requester can cancel the job by selecting the "cancel request" field in screenshot #9 and confirming the cancellation as shown in screenshot #10. If the job is not cancelled, the requester will next see screenshot #11, where they can confirm the pick-up address for the goods which has previously been specified, or they can enter a new pick-up address as shown in screenshot #12. Once the pick-up address is determined, the requester provides specific contact information about the point of contact at the pick-up location, as shown in screenshot #13.

Next, as shown in screenshot #14, the requester may specify the drop-off address for the goods, either by selecting a previously-saved address or by entering a new address. Again a visual map of the drop-off address is presented to the requester so they can confirm the location. In screenshot #15, the requester provides the contact information for the point-of-contact at the drop-off location. Next, in screenshot #16, the requester provides written or textual information on the goods to be delivered.

If the goods are recently purchased from a store and the requester has a receipt, he or she may use the receipt to provide some or all of the information needed by the system. For example, as shown in screenshot #17, the requester can use his or her mobile computing device, e.g., smartphone or the like, to take a picture of (or otherwise visually scan) the receipt of the goods' purchase such that the system can process the resulting image of the receipt and process it to derive contextual information therefrom. In particular, the receipt of the goods' purchase may be processed through a vision software program and then analyzed to identify specific information from the data derived. As shown in screenshots #17 through #19, the data from the receipt may be populated into fields within the UI, such that the SKU of the product or products is identified, and the details of these products is listed on the UI for the requester to confirm. As shown in screenshot #18, the goods can be identified with the product number (e.g., 134546578987) along with a product description ("LRG WOOD PLANKS") along with a quantity per unit (1PC) along with any dimensional information (2×6FT), along with any other information, such as color or price. Importantly, the system analyzes the receipt to also determine a location of the store from which the goods were purchased, which can be used by the system to automatically determine the pick-up address of the goods. The processing of the information derived from the receipt can be controlled through algorithmic processing which can be gradually improved to analyze more information and different types of receipts and other documents. Once this information is populated into the system, the requester may edit the information accordingly or as needed. For example, as shown in screenshot #19, the requester may identify that the quantity of wood plans is 3, or that the size of a normal product is of a particular size. Other information may also be captured from the receipt and populated into the system, all of which is considered within the scope of the present disclosure. For example, the receipt may include a coupon or promotional indicator for use of the system such that when the receipt is scanned by the requester, the coupon is automatically added to the requester's account and applied to a job. In another example, the receipt may indicate that the store from which the goods were purchased will hold the items until pick-up can occur, the details of which can automatically be input into the system through capture of the receipt.

Next, in screenshot #20, the requester is presented with a UI in which they enter the value of the goods to be delivered. The value of the goods may be used to identify if it is necessary or appropriate to purchase insurance for the job. Then in screenshot #21, the requester is presented with the interface to upload images of the goods. Here, the requester can take photographs of the goods on their mobile device and upload them to the system. In screenshot #22, the requester can select which day the pick-up is needed along with other specifying information on the pick-up time. For example, the requester can specify that the pick-up can occur anytime or within a particular time window. In screenshot #23, the requester is presented with a UI screen with a summary of the job. The summary may include all relevant information about the job, including the pick-up address and point-of-contact, the delivery address and point-of-contact, the date and job type, and the estimated price. It is noted that the estimated price may be determined through algorithmic analysis based on relevant information about the job, including the distance between the pick-up location and delivery location, the location of either the pick-up point or delivery point, the time and/or urgency of the job, the availability of providers, the status of the requester (e.g., priority users), or any other information. The detailed pricing may be provided to the requester in screenshot #24 which includes the delivery service charge, any additional costs such as insurance or tax, and other points for price adjustment, such as a field for entering a coupon or for canceling add-on services. Once the requester agrees to the job, he or she may approve the job and pay the fees required. As shown in screenshot #25, the fees may be paid by credit card or through other forms of payment, such as debit card, ACH payment, e-payments, cryptocurrencies, or any other forms of payment.

Finally, after the requester pays the fee, the job can be finally confirmed, as shown in screenshot #26. Here, the job is given a confirmation number or job code (#DD9A992180730) which is identified with the job, as shown in screenshot #27. The job is then posted on the system to allow available providers (drivers) to review the details of the job and accept or deny the job. As shown in screenshot #28, the requester is kept informed about the status of the job through a job lifecycle unit of the system. Here, the requester is provided with a timeline of events and the corresponding message of the event, if present. For example, once a provider accepts the job, he or she can then communicate directly with the requester to indicate the specific time he or she will be at the pick-up location. The information communicated may be communicated directly between the provider and requester, or it may be communicated through the system using automated messages about events. The provider then picks up the goods at the pick-up location and drives them to the delivery location.

To ensure that the delivery is competed correctly, a confirmation code may be used to verify completion of a job. The point-of-contact at the delivery location is provided with a PIN or confirmation code through the UI of the system. The driver or provider does not initially know what the code is, which prevents the provider from indicating completion of a job when it in fact is not completed. Thus, once the delivery of the goods has begun, the system provides the point-of-contact at the delivery location with the PIN or confirmation code, as shown in screenshot #29. When the goods to be delivered have been fully and successfully delivered, the point-of-contact at the delivery location non-electronically communicates the PIN or confirmation code to the provider, e.g. by verbally telling them or showing them the PIN or confirmation code, who may enter this code on the UI of his or her mobile device. If the point-of-contact for the delivery is unavailable to accept delivery, he or she may be able to send the PIN to another individual through an electronic message, such as SMS message, e-mail, or another communication medium. This PIN or confirmation code provides the system with final confirmation that the job was completed successfully and to all parties' satisfaction. The requester may then rate the provider and view a job history UI page, as shown in screenshots #30-#31.

Screenshots #32-#34 may be used when the goods to be delivered are debris, trash, or refuse which is to be disposed of by the provider. In this situation, when the requester is entering the information needed prior to creation of the job, the requester can provide more specification information for the disposal job. For example, the requester can select exactly where the refuse is located at the pick-up address. The requester can also use automated selection fields to specify the quantity of the refuse and the type of refuse. The selection made by the requester can be used by the system to determine which providers can handle the job, which disposal sites are appropriate for the refuse, and any other information that is needed for the job. As is shown in screenshots #35 and #36, at any point in the process, the requester can review information about each event or portion of the process, including contact information and details of the delivery.

Screenshots #37-#51 depict the UI from the provider's point of view. As shown in screenshot #37, when the provider is seeking to complete a job, he or she may review the details of the job within the job bank. Here, the provider is given information about the goods to be delivered, the pick-up and delivery locations, and the date for the delivery. The provider may get further details on the job, as shown in screenshot #38, where the provider may be shown a visual map of the pick-up and delivery locations. If the provider is interested, he or she may apply for the job, as shown in screenshot #39, where the provider can schedule a time for picking up the items. The provider can also directly message or communicate with the requester, as shown in screenshot #40. Once the job has been accepted by the provider, a confirmation of the job tasks is provided to the provider as shown in screenshot #41. Again, for full completion of the job to be verified, once the delivery is complete, the provider will need to enter in the PIN or confirmation code provided by the point-of-contact at the delivery location, as shown in screenshot #42. A confirmation page along with all details of the job can be viewed by the provider in screenshot #43. It is noted that the system provides the provider with various ways to identify the jobs they've completed along with the earnings made from each job, as shown in screenshots #44-#45.

Screenshots #46-#48 depict the variation in the UI of the system for a job that is disposing of refuse. For example, as shown in screenshot #46, the provider may be required to take a photograph of the goods to be disposed of when they're on the provider's vehicle. This may confirm that the provider has possession of the refuse. Then the provider drives to the disposal site and indicates on the system when they have arrived. Similar to the use of the PIN or continuation code with deliveries of goods between pick-up and drop-off locations, a PIN or confirmation code may also be used by the disposal site to confirm that they have received the refuse. For example, the disposal site may be provided with the PIN or confirmation code when the provider is driving to the disposal site, and once the refuse is unloaded, a worker of the disposal site providers the provider with the PIN or confirmation code which the provider enters into the system. As discussed previously, screenshots #49-#51 depict closing out of the job, where the provider can review the details and ratings of the job and information about the provider's account with the system, such as an account page where the earnings are displayed to the provider.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-based method of managing the collection and delivery of physical goods using mobile computing devices, the computer-based method comprising:
receiving, on a computerized collection and delivery management platform hosted on a centralized server, an electronic request from a first user through an application on a first user computing device for a pick-up of at least one item from a first geographic location, wherein receiving the electronic request comprises:
rendering, on the first user computing device, a user interface prompting the first user to input delivery data including the first geographic location and a second geographic location, and wherein the user interface includes an indication of the first geographic location and the second geographic location;
receiving, by the user interface of the first user computing device, the delivery data from the first user; and
receiving, by the computerized collection and delivery management platform, and responsive to the input by the first user, the delivery data from the first user;
responsive to receiving, from the computerized collection and delivery management platform, the electronic request including the delivery data, generating at least one code identifier at the centralized server, wherein the at least one code identifier is a new, unique code that represents the electronic request;
after generating the at least one code identifier, and responsive to receiving, from the computerized collection and delivery management platform, the electronic request including the delivery data, publishing the electronic request to a job bank on the centralized server which visually displays a job summary corresponding to the electronic request to a plurality of second users of the collection and delivery management platform, and identifying at least one second user of the collection and delivery management platform capable of fulfilling the pick-up request, wherein identifying the at least one second user comprises:

querying, by the computerized collection and delivery management platform, available users; and selecting at least one available user based on the delivery data input by the user;

electronically transmitting details of the pick-up request to a software application on a second user computing device of the identified at least one second user, the second user computing device being a smartphone device, wherein a visual map of the first geographic location is visually displayed on a user interface of the second user computing device;

uploading a computer file containing at least one time-stamped, geo-located, digital photograph of the at least one item to the application of the second user computing device and to the centralized server;

at the centralized server, adding the at least one code identifierpreviously generated at the centralized server to the at least one time-stamped, geo-located, digital photograph by visually overlaying or embedding the at least one code identifier to the at least one time-stamped, geo-located, digital photograph, whereby the at least one item within the at least one time-stamped, geo-located, digital photograph and the visually overlayed or embedded at least one code identifier are visible together when viewing the at least one time-stamped, geo-located, digital photograph; and upon delivery of the at least one item from the first geographic location to the second geographic location by the at least one second user, validating delivery of the at least one item by the first user computing device through the at least one code identifier, wherein the at least one code identifier is transmitted from the collection and delivery management platform to the first user computing device.

2. The method of claim 1, wherein the code identifier transmitted to the first user computing device is non-electronically communicated to the at least one second user.

3. The method of claim 1, wherein the at least one code identifier is an alpha-numeric code.

4. The method of claim 1, wherein receiving the request from the application on the first user computing device for the pick-up of the at least one item from the first geographic location further comprises uploading data from at least one receipt corresponding to a commercial purchase of the at least one item.

5. The method of claim 4, wherein uploading data from the at least one receipt further comprises optical character recognition of alpha-numeric characters on the at least one receipt, wherein at least part of the uploaded data is an address of a geographic purchase location of the at least one item, and wherein the address of the geographic purchase location of the at least one item is automatically identified as the first geographic location.

6. The method of claim 1, wherein when the at least one item is an item of refuse, the second geographic location is a refuse disposal facility, wherein the refuse disposal facility is selected by the collection and delivery management platform.

7. The method of claim 1, wherein the at least one item is not a refuse item, the second geographic location is input by the first user on the first user computing device.

8. A computer-based system for managing the collection and delivery of physical goods using mobile computing devices, comprising:

at least one computer processor; and at least one non-transitory computer readable medium comprising instructions that, when executed by the at least one computer processor, cause a computing device to:

receive, on a computerized collection and delivery management platform hosted on a centralized server, an electronic request from a first user through an application on a first user computing device for a pick-up of at least one item from a first geographic location, wherein receiving the electronic request comprises:

rendering, on the first user computing device, a user interface prompting the first user to input delivery data including the first geographic location and a second geographic location, and wherein the user interface includes an indication of the first geographic location and the second geographic location;

receiving, by the user interface of the first user computing device, the delivery data from the first user; and receiving, by the computerized collection and delivery management platform, and responsive to the input by the first user, the delivery data from the first user;

responsive to receiving, from the computerized collection and delivery management platform, the electronic request including the delivery data, generating at least one code identifier at the centralized server, wherein the at least one code identifier is a new, unique code that represents the electronic request;

after generating the at least one code identifier, and responsive to receiving, from the computerized collection and delivery management platform, the electronic request including the delivery data, publishing the electronic request to a job bank on the centralized server which visually displays a job summary corresponding to the electronic request to a plurality of second users of the collection and delivery management platform, and identify at least one second user of the collection and delivery management platform capable of fulfilling the pick-up request, wherein identifying the at least one second user comprises:

querying, by the computerized collection and delivery management platform, available users; and selecting at least one available user based on the delivery data input by the user;

electronically transmit details of the pick-up request to a software application on a second user computing device of the identified at least one second user, the second user computing device being a smartphone device, wherein a visual map of the first geographic location is visually displayed on a user interface of the second user computing device;

upload a computer file containing at least one time-stamped, geo-located, digital photograph of the at least one item to the application of the second user computing device;

upload the computer file containing the at least one time-stamped, geo-located, digital photograph of the at least one item to the centralized server;

at the centralized server, adding the at least one code identifier previously generated at the centralized server to the at least one time-stamped, geo-located, digital photograph by visually overlaying or embedding the at least one code identifier to the at least one time-stamped, geo-located, digital photograph, whereby the at least one item within the at least one time-stamped, geo-located, digital photograph and the visually overlayed or embedded at least one code identifier are visible together when viewing the at least one time-stamped, geo-located, digital photograph; and upon delivery of the at least one item from the first geographic location to the second geographic location by the at least one second user, validate delivery of the at least one item by the first user computing device through the at least one code identifier, wherein the at least one code identifier is transmitted from the collection and delivery management platform to the first user computing device.

9. The system of claim 8, wherein the code identifier transmitted to the first user computing device is non-electronically communicated to the at least one second user.

10. The system of claim 8, wherein the at least one code identifier is an alpha-numeric code.

11. The system of claim 8, wherein receiving the request from the application on the first user computing device for the pick-up of the at least one item from the first geographic location further comprises instructions to upload data from at least one receipt corresponding to a commercial purchase of the at least one item.

12. The system of claim 11, wherein uploading data from the at least one receipt further comprises optical character recognition of alpha-numeric characters on the at least one receipt, wherein at least part of the uploaded data is an address of a geographic purchase location of the at least one item, and wherein the address of the geographic purchase location of the at least one item is automatically identified as the first geographic location.

13. The system of claim 8, wherein when the at least one item is an item of refuse, the second geographic location is a refuse disposal facility, wherein the refuse disposal facility is selected by the collection and delivery management platform.

14. The system of claim 8, wherein the at least one item is not a refuse item, the second geographic location is input by the first user on the first user computing device.

* * * * *